United States Patent
Krulitsch

(10) Patent No.: US 9,896,281 B2
(45) Date of Patent: Feb. 20, 2018

(54) CONTAINER PROCESSING MACHINE AND METHOD FOR OPERATING A CONTAINER PROCESSING MACHINE

(71) Applicant: KHS GmbH, Dortmund (DE)

(72) Inventor: Dieter-Rudolf Krulitsch, Bad Kreuznach (DE)

(73) Assignee: KHS GmbH, Dortmund (DE)

( * ) Notice: Subject to any disclaimer, the term of this patent is extended or adjusted under 35 U.S.C. 154(b) by 89 days.

(21) Appl. No.: 14/892,819

(22) PCT Filed: May 7, 2014

(86) PCT No.: PCT/EP2014/001210
§ 371 (c)(1),
(2) Date: Nov. 20, 2015

(87) PCT Pub. No.: WO2014/187533
PCT Pub. Date: Nov. 27, 2014

(65) Prior Publication Data
US 2016/0167895 A1    Jun. 16, 2016

(30) Foreign Application Priority Data

May 22, 2013 (DE) .................. 10 2013 105 221

(51) Int. Cl.
*B65G 49/00* (2006.01)
*B08B 9/20* (2006.01)
(Continued)

(52) U.S. Cl.
CPC .............. *B65G 49/00* (2013.01); *B08B 9/205* (2013.01); *B08B 9/32* (2013.01); *B08B 9/44* (2013.01); *B65B 3/12* (2013.01); *B65B 43/50* (2013.01); *B65B 43/59* (2013.01); *B65B 55/04* (2013.01); *B65C 9/00* (2013.01); *B65G 29/00* (2013.01); *B65G 47/82* (2013.01); *B67B 3/2033* (2013.01);
(Continued)

(58) Field of Classification Search
CPC  B65B 1/10; B65B 43/50; B65B 43/59; B67C 3/24; B67C 3/225; B08B 9/32
USPC .......................................... 141/144–148, 275
See application file for complete search history.

(56) References Cited

U.S. PATENT DOCUMENTS 2,648,419 A    8/1953  Detrez
3,311,140 A *  3/1967  Hughes .................. B65B 1/363
                                                141/144
(Continued)

FOREIGN PATENT DOCUMENTS

AU        843 766        1/1969
DE        815 007        9/1951
(Continued)

*Primary Examiner* — Timothy L Maust
(74) *Attorney, Agent, or Firm* — Occhiuti & Rohlicek LLP

(57) ABSTRACT

A container-processing machine includes a rotor with processing positions formed thereon, a transfer station, and a static lifting element used by all the processing positions. Each processing position has a processing head and a container carrier. The lifting element is a static lifting element that is used by all of the processing positions. When the processing position is at the transfer station, the lifting element causes relative motion between a container carrier and a processing head of the processing position. This causes the processing position to transition between receiving and discharge states.

23 Claims, 6 Drawing Sheets

(51) Int. Cl.
*B08B 9/44* (2006.01)
*B65B 43/50* (2006.01)
*B65B 43/59* (2006.01)
*B65C 9/00* (2006.01)
*B67B 3/20* (2006.01)
*B67B 3/28* (2006.01)
*B67C 7/00* (2006.01)
*B08B 9/32* (2006.01)
*B65B 55/04* (2006.01)
*B65B 3/12* (2006.01)
*B65G 29/00* (2006.01)
*B65G 47/82* (2006.01)
*B67C 3/22* (2006.01)
*B67C 3/24* (2006.01)
*B67C 3/26* (2006.01)

(52) U.S. Cl.
CPC ............... *B67B 3/28* (2013.01); *B67C 3/225* (2013.01); *B67C 3/24* (2013.01); *B67C 7/0046* (2013.01); *B67C 2003/2665* (2013.01)

(56) References Cited

U.S. PATENT DOCUMENTS

| | | | | |
|---|---|---|---|---|
| 3,441,066 A * | 4/1969 | Wilhere | ................. | B65B 57/06 137/804 |
| 3,559,702 A * | 2/1971 | Riesenberg | ............... | B67C 3/04 141/128 |
| 3,967,662 A * | 7/1976 | Warner | ................... | B65B 43/60 141/148 |
| 4,159,608 A | 7/1979 | Masuda et al. | | |
| 4,467,846 A * | 8/1984 | Croser | ..................... | B67C 3/22 141/148 |
| 5,085,354 A * | 2/1992 | Sogliani | ............... | B60T 8/4872 141/147 |
| 5,313,990 A * | 5/1994 | Clusserath | ............... | B67C 3/10 141/147 |
| 6,736,172 B1 * | 5/2004 | Chetaille | ................... | B67C 3/10 141/145 |
| 7,108,025 B2 * | 9/2006 | Bernhard | ............... | B67C 3/244 141/144 |
| 8,434,530 B2 * | 5/2013 | Conforti | ................... | B67C 3/10 141/105 |
| 8,955,560 B2 * | 2/2015 | Clusserath | ............... | B67C 3/06 141/145 |

FOREIGN PATENT DOCUMENTS

| | | |
|---|---|---|
| DE | 31 33 341 | 3/1983 |
| DE | 34 44 876 | 6/1986 |
| DE | 295 08 048 | 9/1996 |
| DE | 197 02 770 | 7/1998 |
| DE | 10 2011 079 078 | 1/2013 |
| FR | 2 494 237 | 5/1982 |
| WO | WO2013/007430 | 1/2013 |

\* cited by examiner

CONTAINER PROCESSING MACHINE AND METHOD FOR OPERATING A CONTAINER PROCESSING MACHINE

RELATED APPLICATIONS

Under 35 USC 371, this application is the national stage of international application PCT/EP2014/001210, filed on May 7, 2014, which claims the benefit of the May 22, 2013 priority date of German application DE 102013105221.5, the contents of which are herein incorporated by reference.

FIELD OF INVENTION

The invention relates to container-processing machines, and in particular, to transferring containers in and out of such machines.

BACKGROUND

Known container-processing machines include rotary machines having a large number of processing positions on a rotor. Each such processing position has, among other things, a processing head and a container carrier.

Such container-processing machines include first and second transfer stations. At the first transfer station, containers to be processed are transferred one at a time from an external transporter to a processing position. At the second transfer station, processed containers are removed from the processing positions.

In many cases, both of these operations involve a vertical relative movement between the processing head and the container carrier of the relevant processing position. This movement causes a transition between a transferring state and a processing state.

In the transferring state, the container carrier is lowered so that it is further from the processing head. In the processing state, the container carrier moves closer to the processing head. This seals the container on the container carrier against the processing head and permits a probe-like section of the processing head to extend into the container interior. An example of such a probe-like section is a filling tube having probe-like element for determining a filling level. Another example is a tube for introducing a cleaning or disinfecting medium into the container.

Known container-processing machines provide each processing position with its own dedicated lifting element. This lifting element lifts the container carrier. A typical lifting element includes a positioning drive, such as a lifting cylinder or a linear drive. This makes it possible to rapidly raise or lower container carriers using a lifting element with a compact design that also avoids complex lifting or control cams and wear-prone cam rollers.

SUMMARY

An object of the invention is to provide a container-processing machine having a simplified design that retains the fundamental advantages of a control system for the lifting movement of the container carriers and that avoids reliance on lifting or control cams.

In one aspect, the invention features a container-processing machine having only one transfer station. At this one transfer station, containers to be processed are conveyed to processing positions. Also at this transfer station, processed containers are removed from the processing positions. Only a single lifting element, with a drive element or positioning drive, is needed to lift the container carriers of the processing position. This lifting element is provided statically, for example on the machine frame itself.

In another aspect, the invention features a container-processing machine with first and second transfer stations. The first transfer station transfers containers to be processed to the processing positions. The second transfer station removes processed containers from the processing positions. In this embodiment, only two common lifting elements for the lifting movement of the container carriers of the processing positions are provided for all processing positions. These lifting elements are provided statically.

The container-processing machine is configured such that bringing the processing position to the transfer station engages a drive connection between the container carrier and the lifting element. Similarly, removing the processing position from the transfer station automatically disengages this drive connection.

In some embodiments, a lifting element includes a coupling piece to achieve this automatic engagement and disengagement. In this embodiment, rotor movement causes the coupling piece to engage the container carrier to form a drive connection or to disengage from the container carrier to release the drive connection.

In one aspect, the invention features a container-processing machine having a rotor configured to be driven to rotate about a vertical machine axis thereof, a first transfer station, a first lifting element, a drive associated with the lifting element, and a plurality of processing positions formed on the rotor. Each processing position has a processing head and a container carrier. The first lifting element is a static lifting element that is used by all of the processing positions. In operation, when the processing position is at the first transfer station, the first lifting element causes relative motion between a container carrier and a processing head of the processing position. This relative motion causes a transition of the processing position between a receiving state and a discharge state. In the receiving state, the processing position is prepared to receive a container to be processed. In the discharge state, the processing position is prepared to discharge a processed container. Containers to be processed are transferred to the first processing position at the first transfer station, and containers that have been processed are transferred from the first processing position at the first transfer station.

Embodiments include those that also have a transfer device that transfers containers to processing positions and that removes containers from the processing positions. A suitable transfer device is a transport star.

In other embodiments, the rotor is configured to be driven cyclically or in steps.

In yet other embodiments, the first static lifting element is the only static lifting element.

Also among the embodiments are those that further include a second transfer station. Among these are embodiments in which the first lifting element serves both the first and second transfer stations, and embodiments in which the first lifting element serves only the first transfer station and the second lifting element serves the second transfer station.

Since one can traverse a circle clockwise or counter-clockwise, in those embodiments that have first and second transport positions, complementary angular ranges separate the transfer positions. One of these ranges is smaller than the other. In these embodiments, a drive connection temporarily exists between the first lifting element and a movable element of a processing position. This drive connection exists only when the processing position is disposed within the smaller of the two complementary ranges.

In some embodiments, the first static lifting element is provided at the first transfer station.

Other embodiments have a locking device configured to lock either the processing head or the container carrier in a position in which it was raised by the first lifting element.

In other embodiments, a drive connection temporarily exists between the first lifting element and a movable element of a processing position. This drive connection exists when the processing position is disposed at the first transfer station.

Yet other embodiments are those in which the processing head includes a movable element and a coupling piece that engages the movable element to create a drive connection between the lifting element and the movable element when the processing position moves to the first transfer station.

Some other embodiments have a coupling piece configured such that, when the processing position moves to the first transfer station, the coupling piece engages the processing position. These embodiments include those in which the coupling piece forms either an undercut or an opening into which either the coupling piece or the coupling element moves as a result of rotary motion of the rotor.

Among the embodiments are those in which the container-processing device is a filling machine and those in which it is a sterilizing machine.

Yet other embodiments include those in which the drive includes a pneumatic cylinder and those in which it includes an electric linear drive.

In another aspect, the invention features a method for operating a container-processing machine as recited above. The method includes causing the rotor to bring a processing position to the transfer station, and using the lifting element, causing relative movement between a processing head and a container carrier of the processing station.

In some practices, causing relative motion includes, using the lifting element to lift the movable element into a raised state, and, while the structure is in the raised state, locking the structure in the raised state until the structure is to be lowered by the lifting element.

Other practices include driving the rotor cyclically.

Yet other practices include causing a transport star to transfer containers to be processed to the container processing positions and to remove processed containers from the processing positions.

As used herein, "movable element" is either the container carrier or the processing head.

In some embodiments, the container-processing machine is configured such that a single transfer device serves both to transfer the containers to the processing positions and to accept the containers from the processing positions.

In other embodiments, the transport element is driven in cycles.

In yet other embodiments, one static lifting element is provided at a single transfer station at which the containers are both removed from the processing positions after having been suitably processed and also where the containers are transferred to the processing positions in anticipation of being suitably processed.

Embodiments also include those that have not one but two discrete transfer stations. These embodiments include those that have a common lifting element associated with both transfer stations and those that have a dedicated static lifting element associated with each transfer station for the transfer of the containers to be processed to the processing positions and for the removal of the processed containers from the processing positions.

In some embodiments, a static lifting element is provided at the transfer station.

Other embodiments include, at each processing position, a locking device for locking the processing head, the container carrier, or both in a position in which it has been raised by the lifting element.

Also among the embodiments are those that have a temporary drive connection between the lifting element and the processing head or the container carrier of each processing position. This connection exists only, or essentially only, when the processing position is located at the transfer station or on within the smaller of the two angular regions of the rotary movement of the rotor between a transfer station for the transfer of the containers to a processing position and a transfer station for the removal of the processed containers from the processing positions, Other embodiments includes a coupling piece at the processing head or container carrier of each processing position. The coupling piece is engaged for a drive connection with the lifting element or a local coupling element when the processing position moves to the transfer station, and/or is engaged by the processing position concerned moving to the transfer station.

In some embodiments, the coupling piece and/or coupling element forms an undercut or opening into which the coupling piece or coupling element moves as the rotor rotates.

Embodiments include those that are configured as a filling machine for the filling of containers, those that are configured as a cleaning machine for cleaning containers, and those that are configured as a sterilizing machine for sterilizing containers.

In addition, the invention includes embodiments with any of the foregoing features in any combination.

As used herein, the term "container" includes cans, bottles, kegs, tubes, pouches, made from metal, glass and/or plastic, and other packaging media, including those that are suitable for filling products that are in powder form, granulate form, liquid or viscous.

As used herein, "transfer device" includes a device with which containers that are to be processed are individually transferred from an external transporter to processing positions formed on the rotating transport element and/or with which the processed containers are removed from the processing positions and passed to an external transporter. An example of a transfer device is formed a transport star.

As used herein, any reference to containers in sealed contact against the processing head means that the container lies with its container mouth pressed tightly up against the processing head.

As used herein, expressions such as "essentially," "in essence," or "around" refer to variations from an exact value by ±10%, preferably by ±5%, and/or variations in the form of changes that are insignificant to function.

Further embodiments, advantages, and possible applications of the invention arise out of the following description of embodiments and out of the figures. All of the described and/or pictorially represented attributes, whether alone or in any desired combination are fundamentally the subject matter of the invention independently of their synopsis in the claims or a retroactive application thereof. The content of the claims is also made an integral part of the description.

DESCRIPTION OF THE DRAWINGS

These and other features and advantages of the invention will be apparent from the following detailed description and the accompanying embodiments in which.

DETAILED DESCRIPTION

Figure 1:
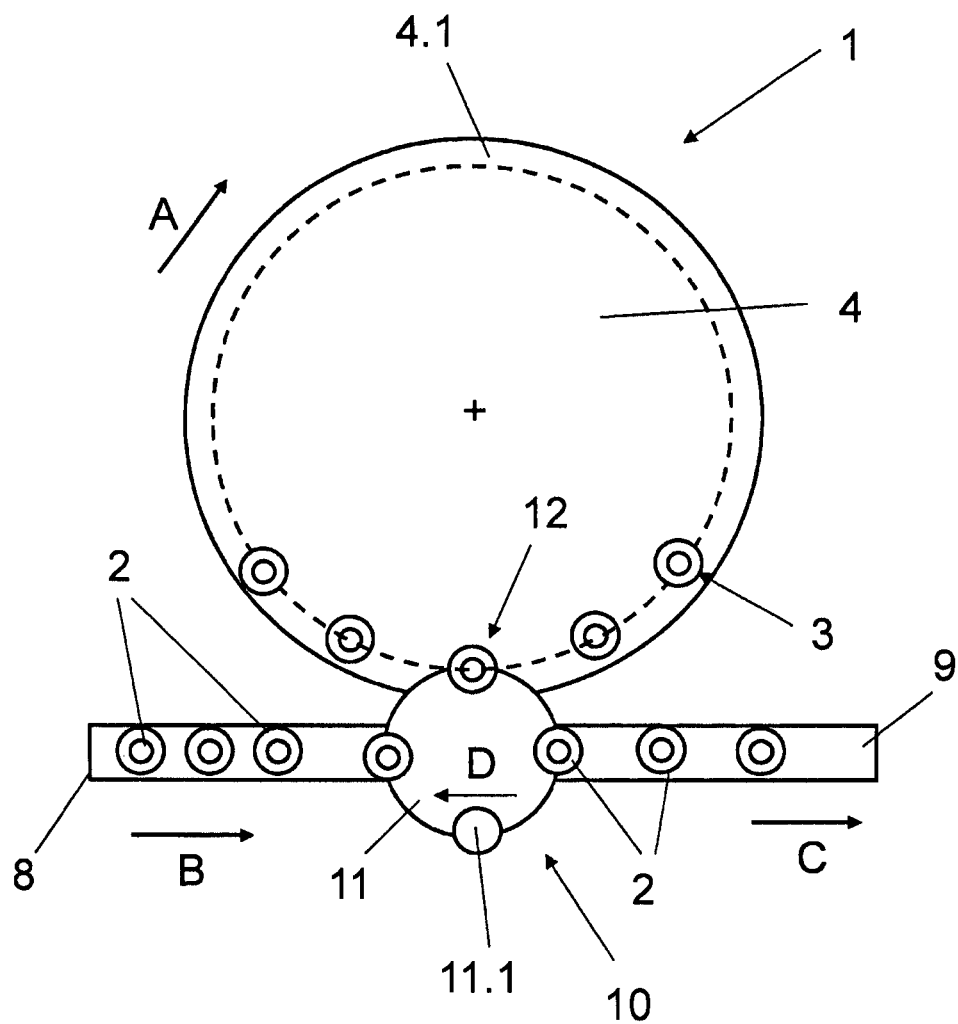
FIG. 1 shows a container-processing machine having a rotary transport element that is configured as a rotor and having a plurality of processing positions around the rotor.

FIG. 1 shows a container-processing machine 1 that processes containers 2, such as bottles. The container-processing machine 1 features a rotor 4 that can be driven to rotate in a rotor-rotating direction A about a vertical machine axis. In operation, the rotor 4 is driven in steps or cycles.

The rotor's periphery has processing positions 3 distributed at equal angular distances about the vertical machine axis and at the same radial distance away from the machine axis. This equal angular distance is the "pitch distance."

Figure 2:
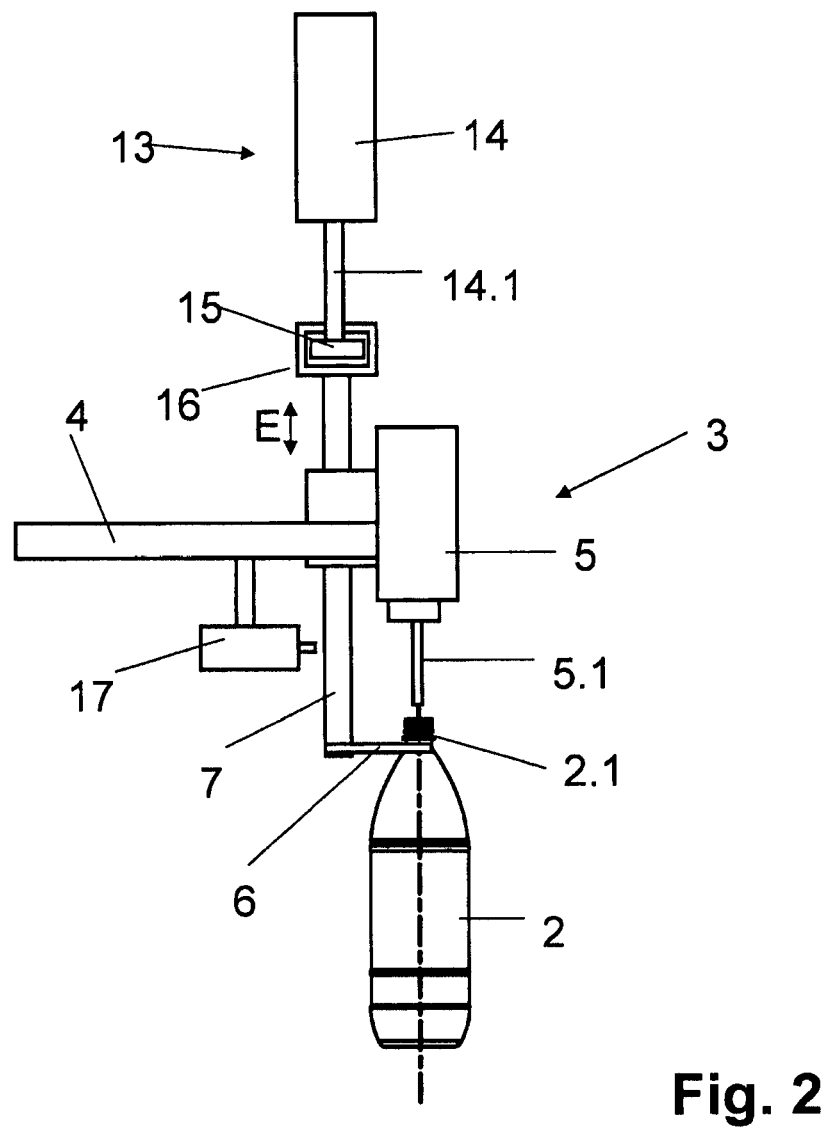
FIGS. 2 and 3 show a processing position of the container-processing machine of FIG. 1 in different operating modes.
Figure 3:
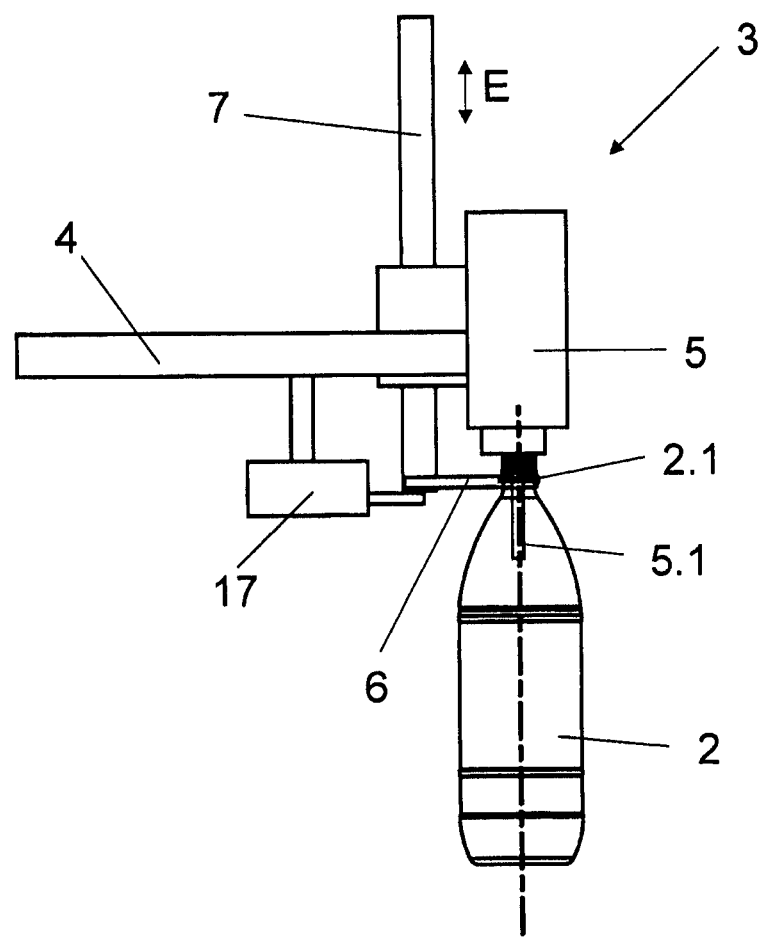

As shown in FIGS. 2 and 3, a processing position 3 includes a processing head 5, a lifting rod 7, and a container carrier 6. The container carrier 6 suspends a container 2 by a mouth flange 2.1 thereof. The lifting rod 7 is fixed to the container carrier 6. In those cases in which the processing machine 1 is a filling machine, the processing position 3 is a filling position having a filling element formed by the processing head 5.

During the course of processing, the container carrier 6 raises a container 2 vertically from a lower receiving-and-transfer level, shown in FIG. 2, up to a processing level, shown in FIG. 3. At the processing level, a probe-like or tube-like section 5.1 of the processing head 5 reaches through the container opening and into the container interior. After processing, the container carrier 6 lowers the container 2 back down to the receiving-and-transfer level.

Referring back to FIG. 1, a first external transporter 8 feeds containers 2 to be processed to the container processing machine 1 along a feeding direction B. A second external transporter 9 removes processed containers 2 from the container processing machine 1 along a removal direction C. In alternative embodiments, a common transport element carries out the function of both the first and second external transporters 8, 9 especially when, during this feeding and removal, containers 2 are arranged standing upright on a transport element, such as a flat-top chain.

The container-processing machine 1 also includes a common transfer device 10 that is driven synchronously with the rotor 4. The container-processing machine 1 forms both a container entry and a container exit. As such, it participates in both the transfer of containers 2 to be processed from the first external transporter 8 to a processing position 3 and in the removal of processed containers 2 from processing positions 3 and the transfer of those containers to the second external transporter 9.

In the depicted embodiment, a transport star 11 forms the common transfer device 10. The transport star 11 is driven cyclically or in steps about a vertical axis in a star-rotating direction D that is the same as the rotor-rotating direction A. The transport star 11 rotates in such a way that, in each rest or standstill phase of the cycled movement of the rotor 4, the transfer device executes two work cycles at a transfer station 12 between the rotor 4 and the transport star 11. During the first work cycle, a processed container 2 is removed from a processing position 3 present at the transfer station 12. Then, during a second work cycle, a container 2 to be processed is transferred to the processing position 3, which is still present at the transfer station 12, or to the container carrier 6, which is still present at the transfer station 12 on a receiving-and-transfer level thereof.

For this purpose, the transport star 11 is configured with container holders 11.1 that are disposed around a first pitch circle at even angular distances about the transport star's axis of rotation. The first pitch circle is tangent to a second pitch circle 4.1 around which the container carriers 6 move. During a standstill phase of the cycled movement of rotor 4, and between the first and the second work cycle of the transfer device 10, the transport star 11 takes a rotational step that is equal in extent to the distance between two adjacent container holders 11.1.

In the foregoing embodiment, almost the entire angular region of the rotary movement of rotor 4 is available for the processing of containers 2. This angular region is just under 360°.

The illustrated container-processing machine 1 has only a single lifting element 13. This single lifting element 13 is all that is necessary for raising and lowering the container carriers 6. This single lifting element 13 at the transfer station 12 is static. It rotates with neither the rotor 4 nor transport star 11.

Referring to FIG. 2, the lifting element 13 includes a pneumatic lifting cylinder 14 having a vertically oriented piston rod 14.1. When in a processing position 3, such as at the transfer station 12, the piston rod 14.1 lies on the same axis or essentially on the same axis as the lifting rod 7. The lifting rod 7 is mounted on the rotor 4 so as to move in a displacement direction E.

At its lower end, the piston rod 14.1 has an extended head 15 that interacts with a coupling piece 16 provided at an upper end of each lifting rod 7. In one embodiment, the coupling piece 16 is a C-section that is open on both sides relative to the rotor's direction of rotation.

In some embodiments, the coupling piece 16 receives the extended head 15 to form a positive fit. In other embodiments, the coupling piece 16 engages behind the extended head 15. In either case, it is solely the rotary movement of the rotor 4 that brings about the resulting connection.

In particular, whenever the rotor 3 causes a processing position 3 to reach the transfer station 12, it pushes a coupling piece 16 onto the extended head 15 of the static lifting element 13. This, in turn, causes the lifting element 13 to lower the container carrier 6 so as to discharge a processed container 2 from the upper processing level to the lower receiving-and-transfer level. Alternatively, after receiving a container 2 that is to be processed, this causes the lifting element 13 to raise the container carrier 6 from the receiving-and-transfer level up to the processing level.

Each container processing position also has a controllable locking device 17. After the container carrier 6 raises a bottle up to the processing level, the locking device 17 locks it on the processing level. It later releases the container carrier 6 so that it can be lowered back down to the receiving-and-transfer level.

Figure 4:
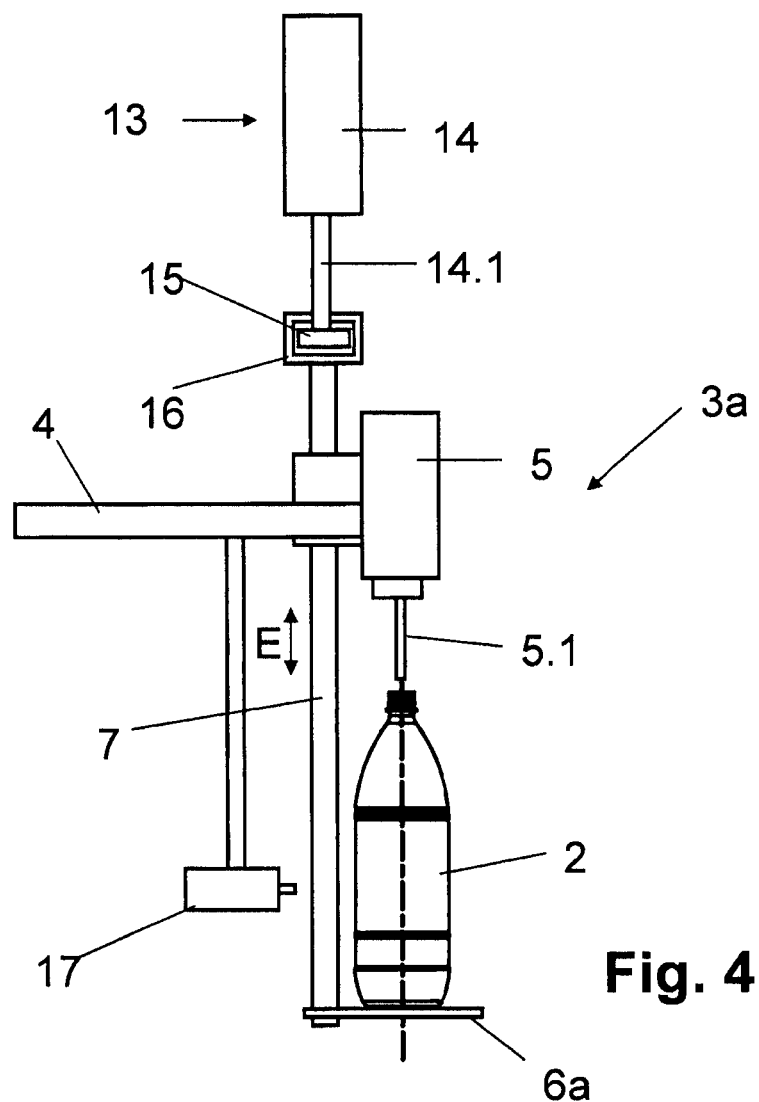
FIGS. 4 and 5 show representations similar to FIGS. 2 and 3 for a further embodiment of the container-processing machine.
Figure 5:
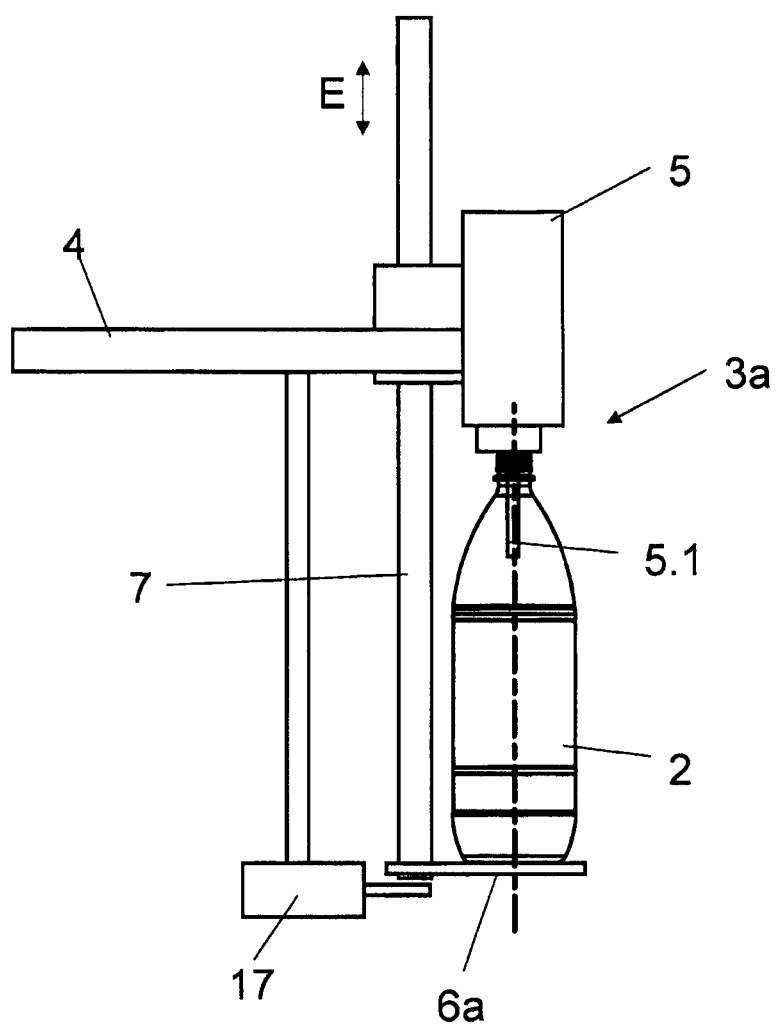

FIGS. 4 and 5 show a further embodiment of a container processing position 3a that is provided on the rotor 4. In this embodiment, containers 2 stand upright on the container carriers 6a.

Figure 6:
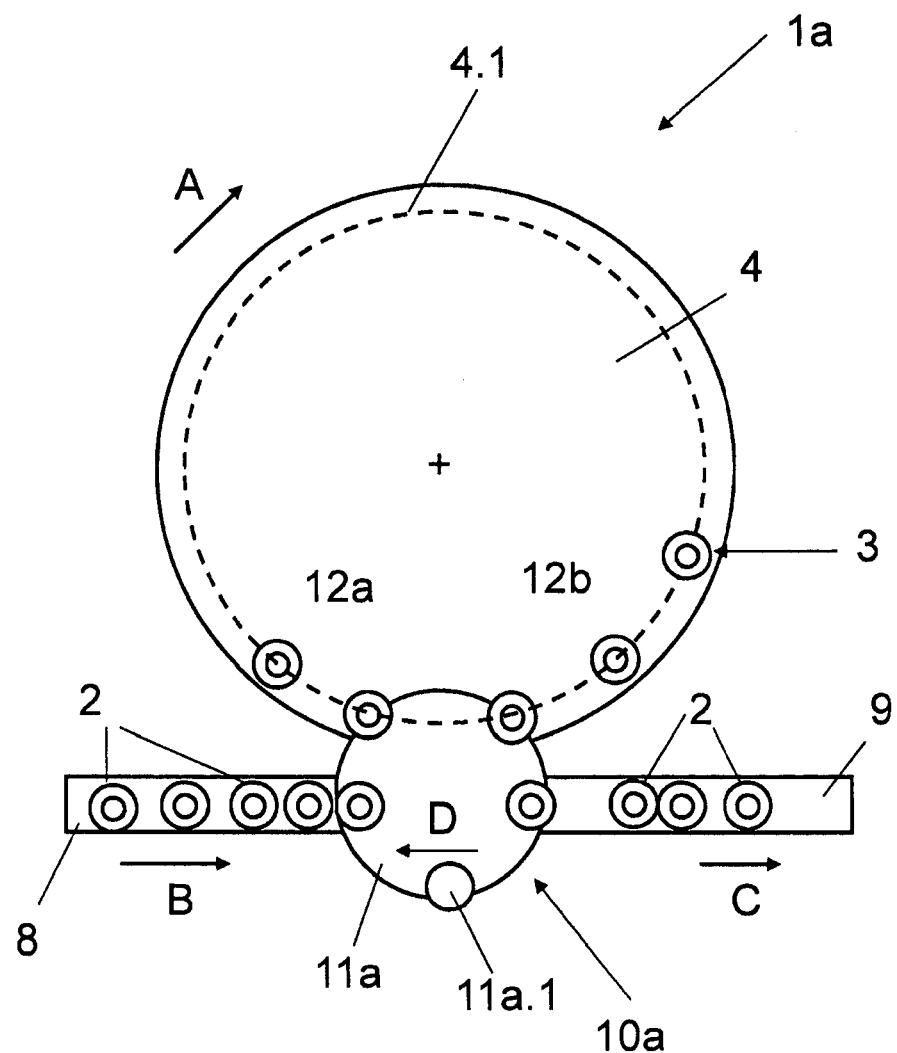
FIG. 6 shows a representation similar to FIG. 1 with a further embodiment of the container-processing machine.

FIG. 6 shows a container processing machine 1a having a transfer device 10a formed by a transport star 11a. At a first transfer station 12A, the transfer device 10a transfers containers to be processed 2 to a processing position 3. At a second transfer station 12B, the transfer device 10a removes processed containers 2 from a processing position 3. The first and second transfer stations 12a, 12b are separated from each other along the transport star's rotating direction D.

The first transfer station 12a receives a container from the first external transporter 8. Upstream from the first transfer station 12a, the second transfer station 12b permits removal of one processed container 2 at a time from a processing position 3.

To achieve these transfers, the container holders 11a.1 of the transport star 11 are arranged on a pitch circle that intersects a pitch circle 4.1 on which the first and second transfer stations 12a, 12b, the processing positions 3 and/or their container carriers 6, 6a are disposed. The distance between container holders 11a.1 is the same as the pitch distance between processing positions 3.

The processing machine 1a has one static lifting element 13 at each of the first and second transfer stations 12a, 12b. The static lifting element at the first transfer station 12a raises a container carrier 6, 6a from the receiving-and-transfer level up to the processing level. The static lifting element at the second transfer station 12b lowers a container carrier 6, 6a down from the processing level to the receiving-and-transfer level.

In the container processing machine 1a, the rotor 4 and the transport star 11a are driven cyclically and synchronously. Almost the entire angular region of the rotary movement of rotor 4 between the first transfer station 12a and the second transfer station 12b is available for the processing of containers 2.

The container processing machines 1, 1a with their reduced installed volume are thus less complicated in design than conventional container-processing machines because a common transfer device 10, 10a in the form of a single transport star 11 or 11a handles both container entry and the container exit. Additionally, only one or at most two lifting elements 13 arranged statically on a machine frame are required for raising and lowering container carriers 6, 6a. Each lifting element 13 has a static drive or a positioning drive that generates the lifting movement.

In the embodiments described herein, the drive of the static lifting element 13 is a lifting cylinder 14. However, other embodiments include different kinds of drives or positioning drives. An example of one of these drives is an electric linear drive. In the embodiments described thus far, raising and lowering the container carrier 6, 6a provides relative motion between the container carrier 6, 6a and a processing head 5. However, it is entirely possible to achieve such relative motion by raising and lowering the processing head 5 instead. In this embodiment, when only a single transfer station 12 is present, a single static lifting element 13 carries out the necessary raising and lowering of the processing head 5. On the other hand, when first and second transfer stations 12a, 12b are present, then two static lifting elements are used to raise and lower processing heads 5.

Embodiments described thus far include a locking device 17 for each processing position. This locking device 17 is arranged on the rotor 4 and rotates with the rotor 4. However, in other embodiments, the locking device 17 is static. It does not rotate. In addition, all container carriers 6, 6a share the same locking device.

Some embodiments implement such a locking device 17 as a static annular sheet that almost completely encloses the rotor 4. This sheet is not present at a transfer station 12, 12a, 12b. If a container carrier 6, 6a is raised to the required processing level and if the rotor 4 has moved on, then the sheet and the container carrier 6, 6a interact with one another in such a way that container carrier 6, 6a remains spatially on the processing level even if it has already left the sphere of action of the static lifting element 13. In some embodiments, the sheet engages a slot provided on a container carrier 6, 6a.

Although the filling procedures described thus far fill a container sealed against the filling element, this is not actually necessary. The apparatus described herein can also be used for open jet filling. In this procedure, the container is not sealed against the filling element, but is instead at a distance away from it. Changing the filling method does not require any invention-relevant modifications. As a result, depictions of the necessary modifications are not necessary.

Having described the invention, and a preferred embodiment thereof, what is claimed as new, and secured by letters patent is:

1. An apparatus for container processing, said apparatus comprising a container-processing machine that comprises a first transfer station and a rotor that is configured to be driven to rotate about a vertical machine axis thereof and that has processing stations formed thereon, wherein each of said processing stations comprises a processing head, a container carrier, a first static lifting element, and an associated drive for said first static lifting element, wherein said first static lifting element serves all of said processing stations, wherein said container-processing machine is specifically designed to carry out a method that comprises causing said rotor to bring a processing position to said first transfer station, and, using said first static lifting element, causing relative movement between a processing head and a container carrier of said processing station.

2. A method comprising operating a container-processing machine that comprises a first transfer station and a rotor that is configured to be driven to rotate about a vertical machine axis thereof and that has processing stations formed thereon, wherein each of said processing stations comprises a processing head, a container carrier, a first static lifting element, and an associated drive for said first static lifting element, wherein said first static lifting element serves all of said processing stations, wherein operating said container-processing machine comprises causing said rotor to bring a processing position to said first transfer station, and, using said first static lifting element, causing relative movement between a processing head and a container carrier of said processing station.

3. The method of claim 2, wherein causing relative movement comprises, using said first static lifting element, lifting said container carrier into a raised state, and, while said container carrier is in said raised state, locking said container carrier in said raised state until said structure is to be lowered by said first static lifting element.

4. The method of claim 2, further comprising driving said rotor in steps.

5. The method of claim 2, further comprising causing a transport star to transfer containers that are to be processed to said container-processing positions and to remove processed containers from said container-processing positions.

6. The method of claim 2, further comprising engaging said processing station with a coupling piece when said processing position moves to said first transfer station.

7. The method of claim 2, further comprising, using said first static lifting element, providing a lifting service at both said first transfer station and at a second transfer station.

8. The method of claim 2, further comprising causing said first static lifting element to provide lifting services at said first transfer station and causing a second static lifting element to provide lifting services at a second transfer station that is separated from said first transfer station by a first angular range, wherein said second transfer station is separated from said first transfer station by a second angular range that, when added to said first angular range, sums to three hundred and sixty degrees of arc, wherein said first and second angular ranges are of unequal extent, said first angular range being smaller than said second angular range, and establishing a drive connection between said first static lifting element and said container carrier only when said processing position is disposed within said first angular range.

9. The method of claim 2, further comprising, using a coupling piece that forms an undercut, engaging said processing position when said processing position moves to said first transfer station.

10. The method of claim 2, further comprising establishing a drive connection between said first static lifting element and said container carrier only when said processing position is disposed at said first transfer station.

11. The method of claim 2, further comprising, using said container-treatment machine, sterilizing containers.

12. The method of claim 2, wherein causing relative movement comprises, using said first static lifting element, lifting said processing head into a raised state, and, while said processing head is in said raised state, locking said processing head in said raised state until said processing head is to be lowered by said first static lifting element.

13. The method of claim 2, further comprising driving said first static lifting element with an electric linear drive.

14. The apparatus of claim 2, further comprising providing a coupling piece for engagement with said container carrier and, when said processing position moves to said first transfer station, causing said coupling piece couple said processing head and said first static lifting element to form a drive connection.

15. The method of claim 2, further comprising providing said first static lifting element at said first transfer station.

16. The method of claim 2, causing said first static lifting element to provide lifting services at said first transfer station, causing a second lifting element to provide lifting services at a second transfer station, and forming a drive connection between said processing head and said first static lifting element only when said processing position is disposed within a smaller of two angular ranges that separate said first and second transfer stations from each other and that, when combined, define a circle.

17. The method of claim 2, further comprising using said container-treatment machine to fill containers using said container-treatment machine.

18. The method of claim 2, further comprising driving said first static lifting element by causing movement of a pneumatic lifting cylinder.

19. The method of claim 2, further comprising providing lifting service at said first transfer station using said first static lifting element and providing lifting service at a second transfer station using a second static lifting element.

20. The method of claim 2, further comprising, using a coupling piece that forms an opening, engaging said processing position when said processing position moves to said first transfer station.

21. The apparatus of claim 2, further comprising engaging said processing head with a coupling piece to create a drive connection between said first static lifting element and said processing head when said processing position moves to said first transfer station.

22. The method of claim 2, further comprising providing, at most, one static lifting element for said container-processing machine.

23. The method of claim 2, further comprising establishing a drive connection between said processing head and said first static lifting element only when said processing position is disposed at said first transfer station.

\* \* \* \* \*